US012352972B2

(12) United States Patent
Cakmakci et al.

(10) Patent No.: US 12,352,972 B2
(45) Date of Patent: Jul. 8, 2025

(54) COMPACT RIM-MOUNTED CURVED OPTICAL SEE-THROUGH LIGHTGUIDE BASED EYEWEAR AS MOBILE AUGMENTED REALITY DISPLAY

(71) Applicant: GOOGLE LLC, Mountain View, CA (US)

(72) Inventors: Ozan Cakmakci, Sunnyvale, CA (US); Daniel Corbalan, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 577 days.

(21) Appl. No.: 17/771,564

(22) PCT Filed: Dec. 13, 2019

(86) PCT No.: PCT/US2019/066240
§ 371 (c)(1),
(2) Date: Apr. 25, 2022

(87) PCT Pub. No.: WO2021/118596
PCT Pub. Date: Jun. 17, 2021

(65) Prior Publication Data
US 2022/0397765 A1      Dec. 15, 2022

(51) Int. Cl.
*G02B 27/01*          (2006.01)
*F21V 8/00*           (2006.01)

(52) U.S. Cl.
CPC ....... *G02B 27/0172* (2013.01); *G02B 6/0031* (2013.01); *G02B 2027/0178* (2013.01)

(58) Field of Classification Search
CPC .. G02B 27/01; G02B 27/017; G02B 27/0101; G02B 27/0172; G02B 27/0178; G02B 17/00; G02B 17/006; G02B 17/0832; G02B 17/0856; G02B 6/00; G02B 6/0028; G02B 6/0003; G02B 6/0031; G02B 6/0043; G02B 2027/0178
See application file for complete search history.

(56) References Cited

U.S. PATENT DOCUMENTS

| 9,213,178 B1 | 12/2015 | Giri et al. | |
| 9,366,869 B2 | 6/2016 | Martinez et al. | |
| 2002/0030639 A1* | 3/2002 | Shimizu | G02B 27/144 345/32 |

(Continued)

OTHER PUBLICATIONS

International Search Report and Written Opinion mailed Sep. 23, 2020 for corresponding International Application No. PCT/US2019/066240, 14 pages.

(Continued)

*Primary Examiner* — Sultan Chowdhury

(57) ABSTRACT

An optical device includes a lightguide and a display at a top of a head mountable frame. The display is oriented toward an eye-side of the optical device. A reflector is positioned at an eye-side of the optical device and directs light into the lightguide. This orientation and arrangement of components reduces light leaking out of the optical device. The lightguide includes curved first and second surfaces. The device reflects light through the curved first surface to a user eye for augmented reality vision. A head mountable frame supports the display, the reflector, and the lightguide.

23 Claims, 11 Drawing Sheets

(56) References Cited

U.S. PATENT DOCUMENTS

| | | | |
|---|---|---|---|
| 2011/0175799 A1 | 7/2011 | Yamada et al. | |
| 2015/0035744 A1 | 2/2015 | Robbins et al. | |
| 2017/0123207 A1 | 5/2017 | Kress et al. | |
| 2017/0227776 A1* | 8/2017 | Yokoyama | G02B 26/0833 |
| 2018/0284444 A1 | 10/2018 | Matsuki et al. | |
| 2019/0018247 A1* | 1/2019 | Gao | G02B 3/12 |
| 2019/0025602 A1* | 1/2019 | Qin | G02B 30/36 |
| 2019/0235253 A1 | 8/2019 | Hua et al. | |
| 2019/0278088 A1 | 9/2019 | Asaf et al. | |
| 2019/0285939 A1* | 9/2019 | Lee | G02B 17/086 |
| 2021/0063742 A1* | 3/2021 | Lee | G02B 27/0176 |
| 2021/0215868 A1* | 7/2021 | Adema | G02B 27/0172 |

OTHER PUBLICATIONS

Cakmakci, Ozan et al., "Head-Worn Displays: A Review," IEEE Journal of Display Technology, vol. 2, No. 3; Sep. 2006; pp. 199-216.

Translation of Chinese Office Action mailed Oct. 20, 2022 for CN Application No. 201980082629.6, 22 pages.

International Preliminary Report on Patentability mailed Jun. 23, 2022 for corresponding International Application No. PCT/US2019/066240, 10 pages.

Communication pursuant to Article 94(3) EPC mailed Nov. 19, 2024 for EP Application No. 19842444.2, 4 pages.

Communication under Rule 71(3) EPC mailed Mar. 11, 2025 for EP 19842444.2, 53 pages.

* cited by examiner

| | SURFACE 318 | SURFACE 445 |
|---|---|---|
| $X^2$ | -1.2148 E-02 | 1.5773 E-02 |
| $Y^2$ | -1.3940 E-02 | -8.2635 E-02 |
| $X^2 Y$ | 2.7872 E-06 | -4.5573 E-03 |
| $Y^3$ | 9.8475 E-05 | -4.0386 E-02 |
| $X^4$ | 4.3374 E-06 | 1.9310 E-05 |
| $X^2 Y^2$ | -4.2760 E-06 | 1.3610 E-04 |
| $Y^4$ | -2.3352 E-05 | -1.5966 E-02 |
| $X^4 Y$ | -6.3214 E-07 | 2.3583 E-06 |
| $X^2 Y^3$ | -1.9859 E-07 | -2.1738 E-04 |
| $Y^5$ | 4.5807 E-07 | -3.4997 E-03 |
| $X^4 Y^2$ | | -1.4501 E-05 |
| $X^2 Y^4$ | | -2.4477 E-05 |
| $Y^6$ | | -2.7896 E-04 |
| $X^6$ | 3.4065 E-08 | -2.79 E-04 |

SAG COEFFICIENTS TABLE

FIG. 5

COMPACT RIM-MOUNTED CURVED OPTICAL SEE-THROUGH LIGHTGUIDE BASED EYEWEAR AS MOBILE AUGMENTED REALITY DISPLAY

CROSS-REFERENCE TO RELATED APPLICATIONS

The present application U.S. National Stage under 35 U.S.C. § 371 of International Application No. PCT/US2019/066240, entitled "A COMPACT RIM-MOUNTED CURVED OPTICAL SEE-THROUGH LIGHTGUIDE BASED EYEWEAR AS MOBILE AUGMENTED REALITY DISPLAY", filed on Dec. 13, 2019, the entirety of which is incorporated by reference herein.

BACKGROUND

Some wearable electronic eyewear devices incorporate a near-to-eye optical system to display images to user. Some devices display only a computer-generated image (CGI), while other types of devices are capable of superimposing a CGI over a real-world view. This latter type of device typically includes some form of see-through eyepiece and can serve as a hardware platform for implementing augmented reality (AR).

Electronically enhanced eyewear devices have multiple practical and leisure applications but many of these applications are limited due to cost, size, weight, thickness, field of view, and efficiency of optical systems used to implement existing eyewear devices. For example, use of conventional components typically yields a CGI of only a few degrees width and a few degrees of height, resulting in a poor user experience. Previous eyewear designs have attempted to address these issues by employing curved lightguides in conjunction with a micro-display positioned in a temple region of a head wearable frame similar to a conventional pair of glasses. However, based on the particular geometry and physical constraints of these designs, the lightguide restricts a light path to so as to implement the concealing of the optics within the temple region. In addition, conventional constraints in positioning the components of certain eyewear devices lead to low field of view (FOV) displays.

SUMMARY

Some eyewear devices having a micro-display ("display") are prone to leaking light outside of the device and thereby inadvertently announce the use of an electronic device. Further, some electronically-enhanced eyewear devices require a lightguide length longer than desired. For example, when the display is at the temple location, the lightguide is often required to be tilted at a relatively high angle (e.g. 18 degrees or more) so as to facilitate total internal reflection (TIR) of the display light within the lightguide. These and other constraints yield a low field of view (FOV) display (e.g., on the order of approximately ten degrees diagonal or less).

Some embodiments described herein relate to orienting the display of an eyewear device toward the eye-side of the device and re-use of world-side and eye-side optical components to magnify the display light. The resulting eyewear device has an appearance of regular, non-electronic eyewear— e.g., an appearance of conventional glasses—while simultaneously augmenting an image from the display for improved viewing of information. The eyewear device is able to accommodate prescriptive adjustments to vision with a lens positioned at an eye-side of a frame and incorporate a display within a top portion of the frame where the display generates an image that supplements a world view with text, images, icons, and the like.

A particular feature of some of the embodiments is that a display is oriented to first emit light towards the user wherein the display and other components are sealed from dust and held in place inside the frame such that little to no light from the display leaks to the world-side of the device. This arrangement helps to hold the components in alignment with one another and makes it difficult for an observer to identify if someone is wearing an electronically-enhanced optical system. The arrangement of components makes thinner temples of the eyewear possible and a conventional eyewear arm hinge can be used. When display properly light emerges from the lightguide, the device reuses a base curvature of a curved prescription lens or sunglass to augment the display light, which makes some embodiments desirable in many environments. Many existing forms of state-of-the-art AR-based eyewear devices use flat lightguides and do not accommodate vision correction. Here, use of curved lens surfaces in the lightguide creates a thin, lightweight eyewear device that accommodate a corrective lens in the frame along with the lightguide without substantively enlarging the overall size of the optical device.

The proposed solution in particular relates to an optical device that includes a display oriented toward an eye-side of the optical device and the display is configured to emit light toward the eye-side of the optical device based on an input signal. The optical device further includes a lightguide, a reflector, and a head mountable frame. The lightguide includes a curved first surface at the eye-side of the optical device. A curved second surface reflects the light through the curved first surface to a user eye.

The reflector includes a reflective surface positioned at the eye-side relative to the display above at least one of the curved first surface and the curved second surface of the lightguide. The reflector is positioned to reflect light from the display into the lightguide. The head mountable frame supports the display, the reflective surface, and the lightguide, and the display is positioned at a top of the head mountable frame.

In an exemplary embodiment, the optical device further includes a field lens having a first surface to receive light from the reflector and a second surface oriented toward an interior of the lightguide. The field lens is positioned at a top side of the lightguide. The second surface of the field lens, oriented toward the lightguide, is, for example, spherical in shape.

The display, the lightguide, and the reflector may be positioned so as to reflect light at least two times from at least one of the curved first surface and the curved second surface of the lightguide before the light from the display reaches the user eye.

In an exemplary embodiment, the lightguide includes a third surface at a top of the lightguide for receiving light from the reflector.

In an exemplary embodiment, a surface of the field lens, the lightguide, or both the field lens and the lightguide may be shaped to correct an astigmatism of a computer-generated image (CGI) of the light from the display in at least one of a first dimension and a second dimension, the dimensions being orthogonal to each other or not, as the light progresses from the display toward the user eye.

In an exemplary embodiment, the display is mounted to the head mountable frame and fits within a region having a height that is 4 mm or less above a top edge of the lightguide.

In an exemplary embodiment, the display includes at least 90 vertically arranged pixel rows.

In an exemplary embodiment, the arrangement of the display, the reflector, and the lightguide are arranged in the optical device to provide at least a 10 degree diagonal field of view with respect to a resulting image from the display.

In an exemplary embodiment, the arrangement of the display, the reflector, and the lightguide are arranged in the optical device to provide at least a 3:1 horizontal-to-vertical aspect ratio with respect to a resulting image from the display.

In an exemplary embodiment, a distance between the curved first surface at the eye-side of the optical device and the curved second surface of the lightguide is 4.5 mm or less along a cross-section of the lightguide.

In an exemplary embodiment, an eye relief distance from the curved first surface of the lightguide to the user eye is 26 mm or less.

In an exemplary embodiment, the optical device provides a wrap angle of at least two degrees.

In an exemplary embodiment, a top edge of a resulting image is located at least two degrees below a center axis of a pupil of the user eye.

In an exemplary embodiment, a top edge of a resulting image is located at least two degrees above a center axis of a pupil of the user eye.

In an exemplary embodiment, a resulting image from the display is oriented with at least two degrees of pantoscopic tilt relative to the user eye.

In an exemplary embodiment, a fourth surface of the lightguide is spherical having a spherical dimension between 80 mm and 100 mm of curvature.

In an exemplary embodiment, the curved second surface of the lightguide includes a combiner for a resulting image from the display, where the resulting image is from the display and a world view form a combined view for observing by the user eye.

Generally, the lightguide, the display, a field lens, and the reflector may be positioned in front of a user's eye such that a combiner surface of the combiner is in front of the user's eye and the combiner surface is at or near an intersection of the lightguide and an optical axis extending horizontally from a center of the pupil. The combiner surface may have a non-planar combiner curvature.

In an exemplary embodiment, the optical device may include a filler piece having a first surface shaped to conform to a world-side fourth surface of the lightguide and shaped to fit into a recess (aperture) in the lightguide, wherein the filler piece has a second surface shaped to conform to the curved second surface of the lightguide. For example, on an eye-side of the filler piece, a first matching surface of the filler piece may be shaped to match a combiner curvature of a combiner surface of a combiner aperture of the lightguide. In such an embodiment, display light from the display and ambient light from the world-side of the lightguide are combined in or near the combiner aperture.

In an exemplary embodiment, the first and second curved surfaces are transparent and the lightguide may further include a transparent third surface oriented toward the top of the head wearable frame for receiving display light, the display light reflecting inside the lightguide via total internal reflection. A transparent curved fourth surface is shaped to reflect light from the display through the transparent curved first surface to a user eye and to combine the display light with ambient light entering from the world-side through the transparent curved second surface of the lightguide, wherein the reflector is positioned on the eye-side of the apparatus and oriented to direct light from the display into the lightguide through the transparent third surface.

In such an embodiment, the optical device may include a display lens positioned at the top of the lightguide, wherein a first surface of the display lens is oriented toward the third surface of the lightguide, and wherein the first surface of the display lens is curved in a freeform manner along a first axis and the first surface of the display lens is curved along a second axis perpendicular to the first axis thereby augmenting a resultant image area in at least one dimension at the transparent curved fourth surface of the lightguide. Additionally, a curvature of the transparent curved fourth surface of the lightguide may be freeform along at least one axis, and light from the display may be reflected at least two times by internal reflection from each of the curved first and second surfaces of the lightguide before reflecting from the transparent curved fourth surface and then the light may be transmitted through the transparent curved first surface on the eye-side of the lightguide toward a user eye. Additionally or alternatively, a curvature of the transparent curved third surface of the lightguide may be freeform along at least one axis thereby augmenting a resultant image area in at least one dimension at the transparent curved fourth surface of the lightguide.

The proposed solution further relates to an apparatus including a display positioned at a top of a head wearable frame (of the apparatus) and oriented toward an eye-side of the apparatus. A lightguide directs light from the display toward an eye-direction. A reflector is positioned on the eye-side of the apparatus. The lightguide includes a transparent curved first surface on the eye-side of the lightguide, a transparent curved second surface on a world-side of the lightguide, and a transparent third surface oriented toward the top of the head wearable frame for receiving display light. The display light reflects inside the lightguide via total internal reflection. A transparent curved fourth surface is shaped to reflect light from the display through the transparent curved first surface of the lightguide to a user eye and combines the display light with ambient light entering from the world-side through the transparent curved second surface of the lightguide. The reflector is oriented to direct light from the display into the lightguide through the transparent third surface.

In an exemplary embodiment, a display lens may be positioned at the top of the lightguide, wherein a first surface of the display lens is oriented toward the third surface of the lightguide, and wherein the first surface of the display lens is curved in a freeform manner along a first axis and the first surface of the display lens is curved along a second axis perpendicular to the first axis thereby augmenting a resultant image area in at least one dimension at the transparent curved fourth surface of the lightguide. In such an embodiment, a curvature of the transparent curved fourth surface of the lightguide may be freeform along at least one axis, and light from the display may be reflected at least two times by internal reflection from each of the curved first and second surfaces of the lightguide before reflecting from the transparent curved fourth surface and being transmitted through the transparent curved first surface on the eye-side of the lightguide toward a user eye. Additionally or alternatively, a curvature of the transparent curved third surface of the lightguide is freeform along at least one axis thereby augmenting a resultant image area in at least one dimension at the transparent curved fourth surface of the lightguide.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 5 illustrates a set of example coefficients characterizing reflective surfaces of a curved lightguide in accordance with some embodiments.

DETAILED DESCRIPTION

Figure 1:
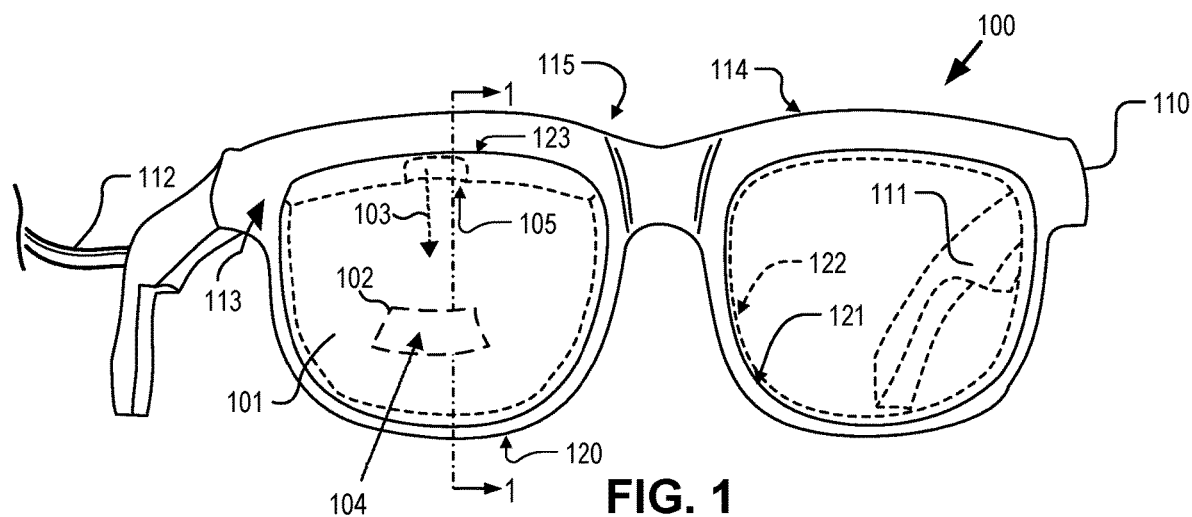
FIG. 1 illustrates a perspective view of an eyewear device in accordance with some embodiments.

FIG. 1 illustrates a perspective view of an optical device in the form of an eyewear device 100 in accordance with some embodiments. The device 100 broadly illustrates components of eyewear devices further described herein. The device 100 includes one or a pair of lightguides 101 mounted in a frame 110. The frame 110 secures the lightguides 101 between a top side 114 and a bottom side 120 thereof. The frame 110 is shaped into a form similar to an ordinary pair of eyeglasses. Generally, the lightguide 101 is transparent and operates as a lens for viewing in front of a user and for directing light of a display 105 toward the user eye thereby providing an AR-based view from the device 100.

For a single display 105, a lightguide 101 includes a surface having a dielectric mirror coating that acts as a combiner 102 that reflects light 103 originating from the display 105. The display 105 is mounted above a top edge 123 of one of the lightguides 101 at the top side 114 of the frame 110. The lightguide 101 allows ambient light 104 from a world-side 113 to pass through to the eye-side 115 of the lightguide 101 and the dielectric mirror coating of the combiner 102. The frame 110 includes two arms 111 that extend from a temple location of the frame 110 on respective sides of the frame 110 toward and over ears of a user (not illustrated). In some embodiments, one arm 111 houses a cord 112 to power the various components including the display 105 and its package and to provide an image data signal to the display 105 from a computing device or other display driving data source (not illustrated). In other embodiments, at least one arm 111 includes or houses components to receive and provide the signal wirelessly to the display 105. Power is provided by a battery or other form of energy local to the device 100 or from a source external to the device 100.

The placement of the display 105 in an eye-ward orientation at the top of the lightguide 101 is supported by various features of the lightguide 101 such as having a curved eye-side surface 122 and a curved world-side surface 121. According to certain embodiments, these curved surfaces 121, 122 are spherical, and each of these curved surfaces 121, 122 has a similar or approximately a same sized characteristic dimension (e.g., spherical dimension, radius, set of curvature parameters) as each other so as to implement zero optical power (diopter) optical see-through. The curved world-side surface 121 is a first surface and the eye-side surface 122 is a second surface. A surface at a top of the lightguide 101, according to certain embodiments, is freeform so as to correct for astigmatism, if any, with respect to the display 105 and light emitted therefrom. The surface at the top of the lightguide 101 is a third surface of the device 100.

Another surface of the lightguide 101 provides a final reflection of light from the display 105 toward a user eye, and the surface is also curved in a freeform manner in at least some embodiments. This final surface is referred to herein as a combiner 102 or combiner surface. The image reflected therefrom is referred to as a light field and is provided to the user eye. In other embodiments, the final surface of the lightguide 101 is a rotationally symmetric aspherically-shaped surface, an anamorphic aspherically-shaped surface, a toroid-shaped surface, a Zernike polynomial-shaped surface, a radial basis function-shaped surface, an x-y polynomial-shaped surface, or a non-uniform rational b-spline-shaped surface. In some embodiments, at least the surfaces of the lightguide 101 of the device 100 operate as an optical magnifier for the light emitted from the display 105. The described techniques are applicable to all types of see-through devices, such as eyeglasses, helmets, head-mounted display (HMD) devices and windshields and enable optical merging of computer generated and real-world scenes to form a combined view. A thickness of certain embodiments of the lightguide 101 is up to approximately 4 mm. Parts of the optics, including the display 105, take up about 3.5 mm of space hidden in the rim of a top of the frame 110 of the device 100. To lighten a weight of the eyewear device 100, some embodiments are monocular as illustrated—a device 100 with a single lightguide 101 and one display 105.

Figure 2:
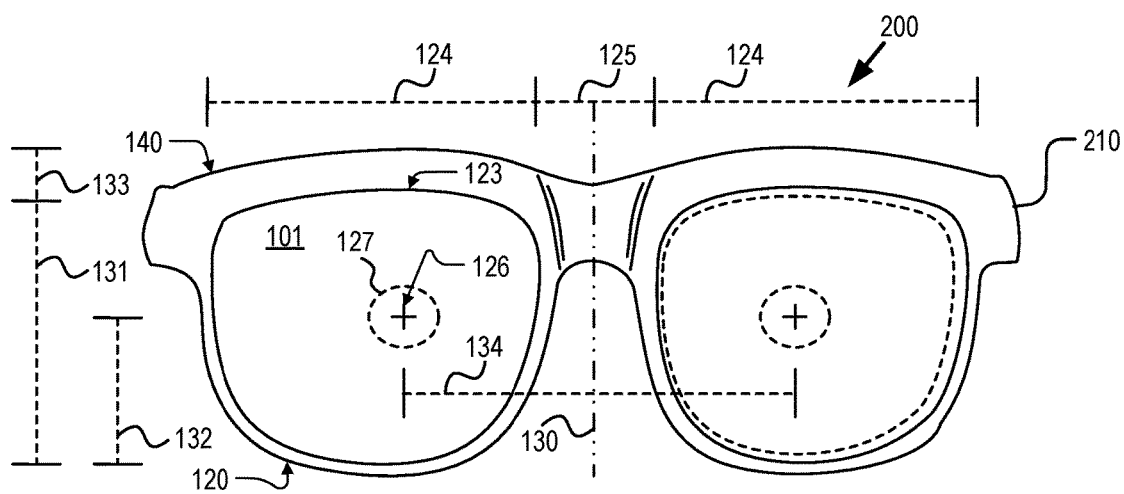
FIG. 2 illustrates a front view of a frame rim portion of the eyewear device of FIG. 1 in accordance with some embodiments.

FIG. 2 illustrates a front view 200 of a rim frame portion 210 of the eyewear device 100 in accordance with some embodiments. By way of example, the rim frame portion 210 provides prescriptive support of between approximately −4D and +2D, with D referring to diopters, for a user as the user is provided with augmented reality vision through the lightguide 101. Dimensions of the device 100 are based on a pupil diameter 127 of approximately 4 mm positioned relative to a pupil center 126. Each of the lightguides 101 for the left and right eyes (not illustrated) are based on a frame horizontal box distance 124 of approximately 53.3 mm and a frame vertical box distance 131 of approximately 44 mm. The lightguides 101 are separated by a bridge length 125 of approximately 17.5 mm. The bridge length 125 is generally centered at a medial position 130 when the device 100 is worn by the user. A fitting height 132 is a distance from the bottom side 120 toward the top edge 123 of the lightguide 101 and the fitting height is approximately 23 mm to the pupil center 126. The rim frame portion 210 is based on an inter-pupillary distance (IPD) of approximately 63 mm.

Some embodiments of the lightguides 101 are oriented with a pantoscopic tilt up to approximately 12 degrees. The frame portion 210 positions one or two curved lightguides 101 at a wrap angle up to approximately 15 degrees with some embodiments having a wrap angle of approximately 10 degrees with respect to a planar field of view in front of the user. In some embodiments, a base curve of the frame is approximately 5.08 (98.435 R). A top portion of the rim frame portion 210 has a thickness 133 of up to 4 mm with some embodiments having a thickness 133 of 3.5 mm or less. In a particular embodiment, the display inside of the top portion of the frame 110 provides an image of about a 3:1 ratio width-to-height. The corresponding thickness is approximately 3.5 mm of head space. For a display 105 producing an image of about a 8:1 ratio width-to-height, the head space is up to approximately 3.6 mm.

Figure 3:
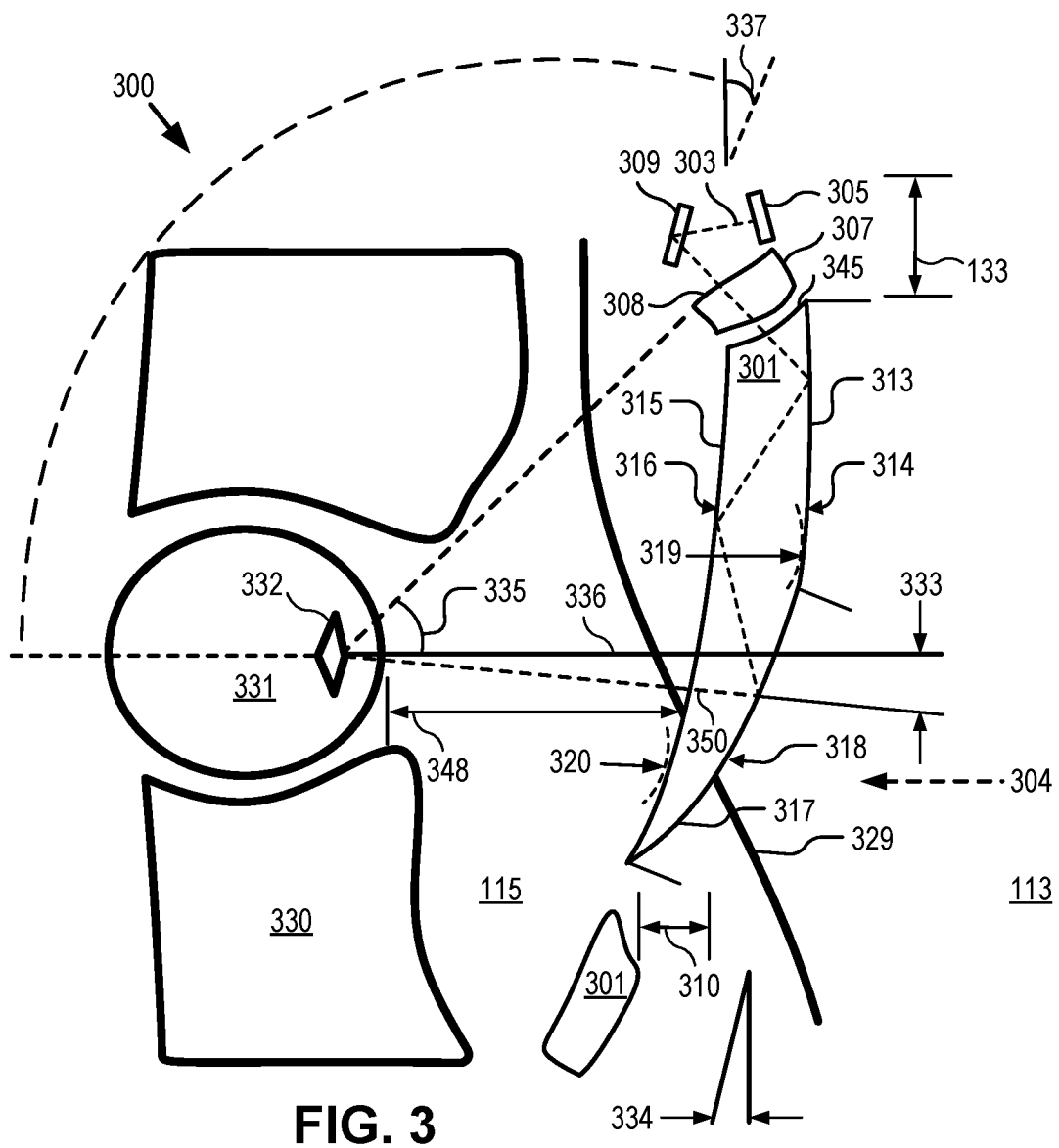
FIG. 3 illustrates a side cross-sectional view of a lightguide, a display, and a field lens along line 1-1 of FIG. 1 in accordance with some embodiments.

FIG. 3 illustrates a side cross-sectional view 300 of a lightguide 301, a display 305, a field lens 307, and a reflector in the form of a mirror 309 along line 1-1 of FIG. 1 in accordance with some embodiments. The view 300 illustrates the orientation of various components of a device like the eyewear device 100 with respect to an eye 331 of a user 330. In the view 300, a frame like the frame 110 is not shown for sake of clarity of illustration and numbering. The display 305 is oriented toward the eye-side 115 of the lightguide 301. The display 305 generates display light 303 toward the mirror 309. The display light 303 travels along a light path 350 toward the eye 331 and its pupil 332. A profile of a nose 329 in front of the eye 331 is visible and shows the device components relative thereto. While one eye 331 is shown, it is understood that a similar set of components is provided for a second eye of the user 330 as shown in other figures when a second screen and lightguide are provided.

In the view 300, the lightguide 301, the display 305, the field lens 307, and the mirror 309 are positioned in front of the eye 331 as shown such that a combiner surface 317 is in front of the eye 331 and the combiner surface 317 is at an intersection of the lightguide 301 and an optical axis 336 extending horizontally from a center of the pupil 332. The combiner surface 317 has a non-planar combiner curvature 318. The display 305, the field lens 307, and the mirror 309 fit within the device rim thickness 133 that is 3.5 mm or less.

In some embodiments, a center of a combiner area or resultant image producing area (not illustrated) within the combiner surface 317 provides a resultant image for the eye 331 and is positioned at a first angle 333 below the optical axis 336 as measured at a center of the image. In some embodiments, the first angle 333 is within 4-15 degrees such as at approximately 10-12 degrees. Horizontally (perpendicular to the view 300), the center of the resultant image is approximately 5-10 degrees offset with respect to a center of the eye 331 at rest. For a right eye, the horizontal offset is to the right of the optical axis 336, and for a left eye, the horizontal offset is to the left of the optical axis 336. Ambient light 304 from the world-side 113 of the lightguide 301 passes through the lightguide 301, including the combiner surface 317, and into the pupil 332 and the eye 331.

From the display 305, the display light 303 first passes to, and is reflected by, a surface of mirror 309 before reaching the field lens 307. In some embodiments, the field lens 307 is mounted to or held in place by one or more of the frame and the lightguide 301. The field lens 307 is made of a same or a different material than a material of the lightguide 301. Based on these materials, one or more of the field lens 307 and the lightguide 301 provide a color correction to one or more of the display light and the ambient light 304 in the eyewear device 100. For example, the display light is corrected for the eye 331 such that color separation in the display light 305 as this light 305 travels through the optics is magnified less than 1.0 arcminutes before reaching the eye 331. In some embodiments, this adjustment is less than 0.5 arcminutes based on geometries of the components and materials of manufacture of the components between the display 305 and the eye 331.

The field lens 307 is also referred to as a prism and is a component having one, two, or more features that direct light to a desired location and with one or more desired characteristics. For example, in some embodiments, a first surface 308 of the field lens 307 is curved along a first axis, along a second axis (e.g., perpendicular to the page containing FIG. 3), or along both a first axis and a second axis. As another example, the first surface 308 is spherical or freeform along one or more of these axes. According to some embodiments, the first surface 308 is positioned at a third angle 335 of approximately 34 degrees above the optical axis 336. The display light 303 passes through a body of the field lens 307 and out a second surface opposite of the first surface 308. The second surface is curved along a first axis, along a second axis, or along both a first axis and a second axis. For example, the second surface is spherical or freeform along one or more of the axes.

Further, the field lens 307 is made of a first material and the lightguide 301 is made of a different second material. For example, the first material is a plastic material and the second material is a glass material, or a synthetic resin material such as Zeonex® E48R. According to some embodiments, a combination of the first material and the second material causes a color correction of the display light 303 by the time the display light 303 reaches the eye 331. For sake of clarity, only a single ray of display light 303 is shown within the lightguide 301 in the view 300. While not illustrated, one or more of the components in the light path 350—such as the display 305, the mirror 309, the field lens 307, and the lightguide 301—include one or more coatings for affecting a quality or a quantity of the display light 303 reaching the eye 331. The field lens 307 directs the display light 303 into an incoupler 345 of the lightguide 301 or a gap between a world-side (first) surface 313 and an eye-side (second) surface 315 of the lightguide 301. The angles of reflection as illustrated do not necessarily reflect actual angles of reflection between the surfaces 313, 315.

In some embodiments, the incoupler 345 is flat or curved where a curvature is spherical or freeform in contour along a first axis, along a second axis, or along both a first axis and a second axis at a top position of the lightguide 301. The curvature of the incoupler 345 corrects some or all of an astigmatism in the resulting CGI formed at the combiner surface 317. According to some embodiments, the resulting CGI or FOV thereof is approximately 40 degrees horizontal and 14 degrees vertical relative to the eye 331 and the pupil 332. In other embodiments, the FOV has an aspect ratio width-to-height with the horizontal size being approximately 45 degrees and the vertical size being approximately 15 degrees.

The lightguide 301 includes the world-side surface 313 having a world-side curvature 314 and an eye-side surface 315 having an eye-side curvature 316. The world-side surface 313 and the eye-side surface 315 are formed or otherwise positioned relative to the incoupler 345 so as to allow for total internal reflection of the display light 303 between the two surfaces 313, 315 as the light 303 travels between the top of the lightguide 301 and the combiner surface 317. Display light 303 enters the incoupler 345 within approximately 24 degrees of a normal of the incoupler 345. The display light 303 reflects from each of the two surfaces 313, 315 one or more times on each surface 313, 315 before reflecting from the combiner surface 317 when traveling toward the eye 331. In certain embodiments, the display light 303 has at least two total internal reflection interactions with the surfaces of the lightguide 301 such as the surfaces 313, 315. In many embodiments, the two surfaces 313, 315 are positioned within about 4.0 mm of each other. In certain embodiments, the lightguide thickness 310 is approximately 4.5 mm or less horizontally as measured at any point along the lightguide 301 from a top to a bottom of the lightguide 301, but the lightguide thickness 310 can vary as needed depending on the various components used and the orientations of these components to create a final AR image by way of the lightguide 301. The lightguide thickness 310 as used herein is a distance between the world-side surface 313 and a closest point or a point opposite at the eye-side surface 315.

According to some embodiments, along the world-side surface 313, the world-side curvature 314 includes a first spherical curvature 319 having a radius between 80-100 mm at the eye-side. Along the eye-side surface 315, the eye-side curvature 316 includes a second spherical curvature 320 having a radius between 80-100 mm at the eye-side. In some embodiments, the first spherical curvature 319 is approximately 91.7 mm and the second spherical curvature 320 is approximately 90.0 mm. In other embodiments, a base curvature of the curvatures 319, 320 is approximately 5 diopters. An efficiency of the device 100, from the display 305 to the eye 331, is approximately 10 percent. In arc-minutes, an acuity is approximately 2.2. A chief ray telecentricity, as measured at a center pixel of the display 305, is approximately 11 degrees. An eye relief distance 348 between the lightguide 301 and a front (cornea) of the eye 331 is approximately 20 mm.

The combiner surface 317 of the lightguide 301 is positioned at a second angle 334, a pantoscopic tilt angle, relative to a vertical axis in front of the eye 331. According to some embodiments, the second angle 334 is measured from the vertical axis to a point within the resultant image reflected from, and relative to, the combiner surface 317. By way of example, the second angle 334 is measured relative to a center of the resultant image from the display 305 reflected from the combiner surface 317. As another example, the second angle 334 is measured relative to a center of the combiner surface 317 of the lightguide 101. In some embodiments, the second angle 334 is approximately 4-10 degrees. A combined angle 337, taking the various configurations of all elements of the device 100 into account, including the first angle 333 and the second angle 334 relative to a vertical axis in front of the eye 331, is approximately 6-8 degrees. A first lightguide 301 is provided for a first (right) user eye, and a second lightguide is provided for a second (left) user eye. Each of the first and second lightguides in the device 101 is wrapped approximately five degrees from a view axis thereby resulting in an overall wrap angle of approximately 10 degrees for the device 101. According to some embodiments, a wrap angle is at least two degrees relative to the view axis.

According to some embodiments, spherical radii of curvature of spherical surfaces of the lightguide 301 are designed such that an optical power thereof sums to zero (i.e., each light guide is a zero power shell). In other embodiments, the spherical radii of curvature optically enlarge light passing through the lightguide 301. As shown in other figures, a see-through shell is maintained a small distance from the lightguide resulting in an aesthetically pleasing eyewear device that provides a substantially enlarged image relative to conventional devices and image viewing systems.

Figure 4:
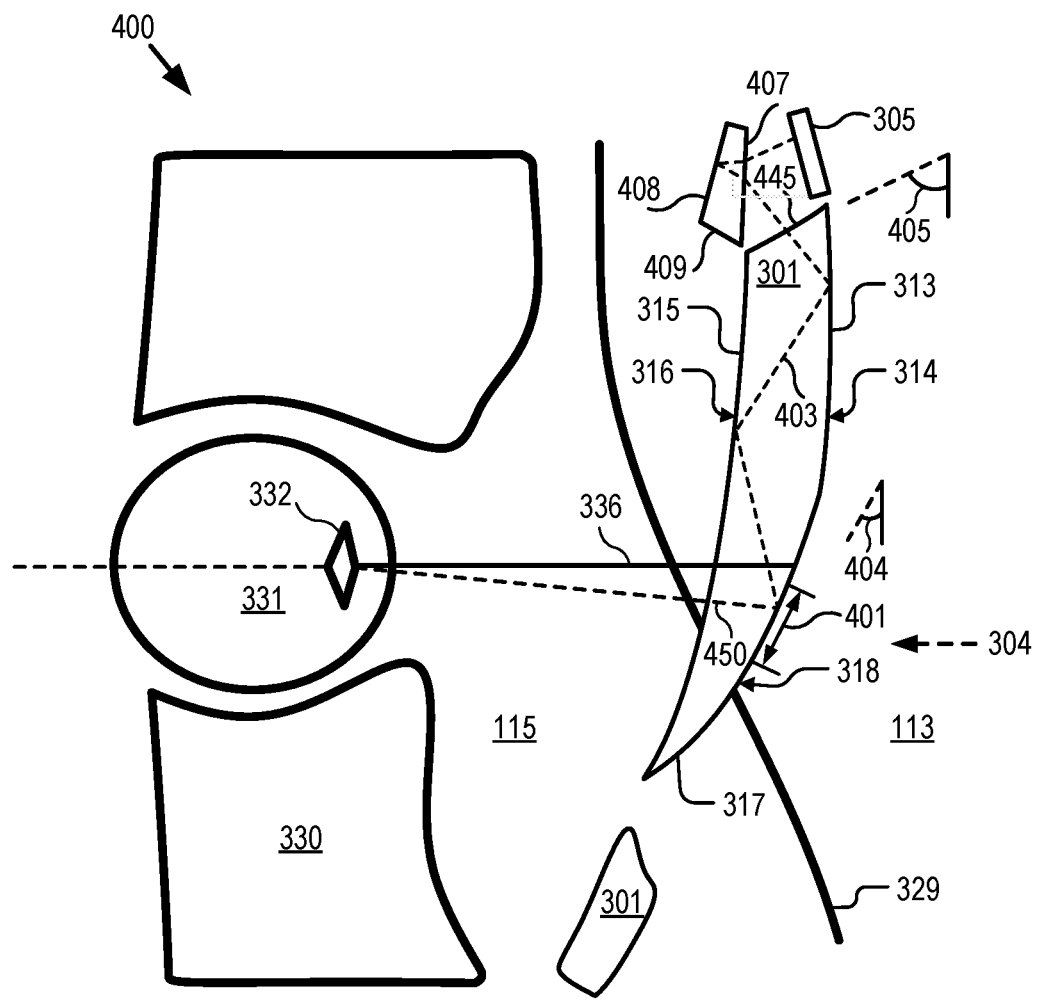
FIG. 4 illustrates a side cross-sectional view of a lightguide, a display, and a reflector along line 1-1 of FIG. 1 in accordance with some embodiments.

FIG. 4 illustrates a side cross-sectional view 400 of the lightguide 301, the display 305, and a reflector 409 along line 1-1 of FIG. 1 in accordance with some embodiments. The view 400 illustrates the orientation of various components of a device like the eyewear device 100 with respect to the eye 331 of the user 330. In the view 400, a frame like the frame 110 is not shown for sake of clarity of illustration and numbering. The display 305 is oriented toward the eye-side 115 of the lightguide 101. The display 305 generates display light 403 toward the reflector 409. The display light 403 travels along a light path 450 toward the eye 331 and its pupil 332. For reference the profile of the nose 329 is visible and shows the device components relative thereto. The display 305 and the reflector 409 fit within the device rim thickness 133 that is approximately 3.5 mm or less. In certain embodiments, the reflector 409 is in addition to a field lens such as the field lens 307 in the device shown in the view 300.

The reflector 409, the field lens 307, and/or the lightguide 301 operate together as a magnifier of the display light 403 when creating an image from the display 305 for the user 330. The lightguide thickness between the world-side surface 313 and a closest point at the eye-side surface 315 is up to approximately 4 mm.

In the view 400, the lightguide 301, the display 305, and the reflector 409 are positioned in front of the eye 331 as shown such that the combiner surface 317 is in front of the eye 331 and the combiner surface 317 is at an intersection of the lightguide 301 and the optical axis 336 through the pupil 332 and the eye 331. In some embodiments, a center of a resultant image producing area 401 is within the combiner surface 317. The combiner surface 317 has a combiner curvature 318 in one or two dimensions relative to the user 330. The center of the image producing area 401 is below an intersection of the optical axis 336. At least a point in the image producing area 401 is located generally an image producing angle 404 and this point is on the combiner surface 317. For example, the image producing angle 404 is at approximately 26 degrees. The angle 404 is also referred to as a combiner tilt angle. This angle 404 is also referred to as a combiner tilt angle and, in some instances, is determined as an average of angles at points within the image producing area 401. Ambient light 304 from the world-side 113 of the lightguide 301 passes through the lightguide 301, including the combiner surface 317, and into the pupil 332 and the eye 331.

From the display 305, the display light 403 first passes into a first planar surface 407 of the reflector 409 and is subsequently reflected by a second planar surface 408 of the reflector 409 before the light 403 reaches a top (third) surface 445 of the lightguide 301. The top surface 445 of the lightguide 301 is also referred to as an incoupler surface of the lightguide 301. In some embodiments, the top surface 445 is planar and is positioned at an incoupler tilt angle 405 of approximately 55 degrees. The orientations and positions of the display 305 and the reflector 409 with respect to the lightguide 301 are arranged so as to cause total internal reflection of display light 403 within the lightguide 301. The total internal reflection occurs, for example, two times from an eye-side 115 of the lightguide 301 and two times from the world-side 113 of the lightguide 301 and thereby achieves two total internal reflections in the lightguide 301. Further, a shape of the reflector 409 and the orientations of the surfaces 407, 408 of the reflector 409 are selected and formed so as to produce a desired quality, size, shape, and position of a resulting image at the image producing area 401 of the lightguide 301. In some embodiments, planes of the planar surfaces 407, 408 are not parallel with each other. Yet further, a material is selected for each of the reflector 409 and lightguide 301. As an example, the reflector 409 is made of a first material and the lightguide 301 is made of a different second material. In this example, the first material is a borosilicate, medium-index (BSM) glass and the second material is a synthetic resin-based material such as Zeonex® E48R. For sake of clarity, only a single ray of display light 403 is shown within the lightguide 301 in the view 400.

FIG. 5 illustrates a set of example coefficients 500 characterizing reflective surfaces of a demonstrative curved lightguide such as the lightguide 301 in accordance with some embodiments. A first surface 501 corresponds to the combiner surface 318 and a second surface 502 corresponds to the top surface 445. A spherical radius of curvature of the combiner surface 318 is approximately −83.26 mm. A spherical radius of curvature of the world-side surface 445 is approximately 85 mm. The example coefficients 500 are consistent with coefficients and measurements known to those in the optics art for freeform lenses and which satisfy the following sag equation relative to an axis or center of a corresponding spherical lens:

$$sag(x, y) = \frac{(1/R)(x^2 + y^2)}{1 + \sqrt{1 - (1/R^2)(x^2 + y^2)}} + \sum C_{m,n} x^m y^n, \quad \text{(Equation 1)}$$

where m and n and x and y are integers, and where R is a length of the radius of the particular surface 501, 502. For example, m=2 and n=0 corresponds to $C_{2,0} = x^2$. A first coefficient 503 corresponds to m=2 and n=0. For the first surface 501, $x^2$ is approximately −1.2148E-02 and for the second surface 502, $x^2$ is approximately 1.5773E-02. The values of the other coefficients 504-516 for the surfaces 501, 502 are as shown in FIG. 5 for a curved lightguide such as the light guide 301 of the device 100. A thickness between the eye-side surface 515 and the world-side surface 513 of the lightguide 301 is approximately four mm.

Figure 6:
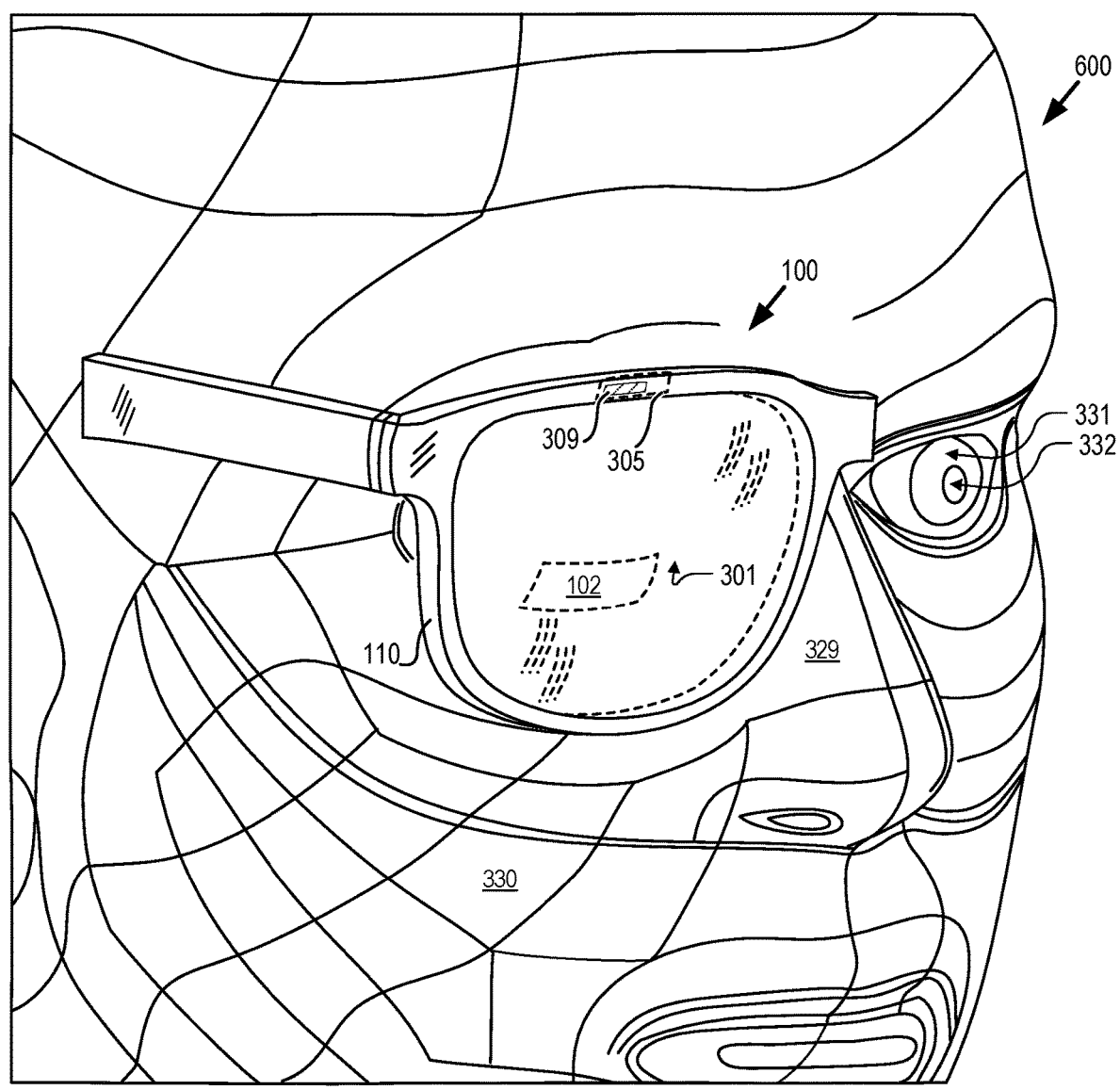
FIGS. 6-9 illustrate perspective views of eyewear devices worn by a user in accordance with some embodiments.

FIG. 6 illustrates a perspective view 600 of the eyewear device 100 worn by the user 330 in accordance with some embodiments. Only a right portion of the device 100 is illustrated to expose operation and a position of the device 100 relative to the user eye 331. Light from the display 105 is first directed toward the eye-side of the device 100 inside a top portion of the frame 110 and is directed into a top side of the lightguide 301 by reflection from a surface of the mirror 309. The frame 110 rests on the bridge of the nose 329 of the user 330. The mirror 309 directs the display light to the combiner 102. The combiner 102 reflects the display light into the pupil 332 of the user eye 331.

Figure 7:
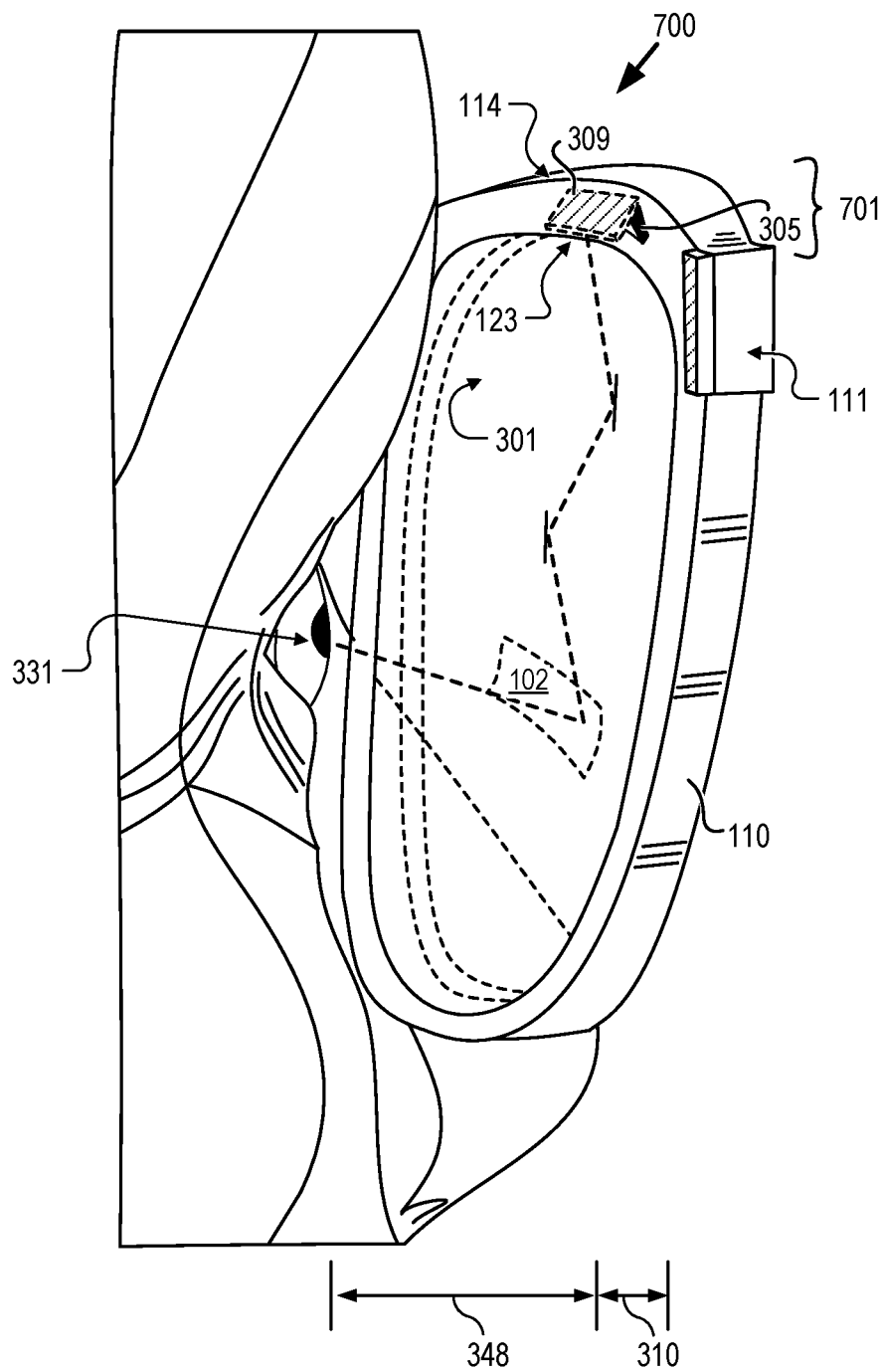

FIG. 7 illustrates a perspective view of an eyewear device 700 generally from the back and right sides where the device 700 is similar to the device 100 illustrated in other figures. The device 700 is worn by the user 330 in accordance with some embodiments. Only a right portion of the device 700 is illustrated to expose operation and a position of the device 700 relative to the user eye 331. Light from the display 305 is first directed toward the eye-side of the device 700 inside a top portion 701 of the frame 110 and is then directed into a top side of the lightguide 301 by reflection from the mirror 309. The display 305 and the mirror 309 are incorporated into the frame 110 between the top side 114 (e.g., top surface) of the frame 110 and the top edge 123 of the lightguide 301. The frame 110 rests on the bridge of the nose 329 of the user 330. The mirror 309 directs the display light to the combiner 102. The combiner 102 reflects the display light into the pupil of the user eye 331. Certain parts of the device 700 fit within the top portion 701 of the frame 110. The top portion 701 of the device 700 is up to about 3.5 mm in size vertically. For a +0D eye glass device 700 (no vision correction), a lightguide thickness 310 is approximately 4.59 mm or less horizontally. The eye relief distance 348 between the lightguide 301 and the front (cornea) of the eye 331 is approximately 14.54 mm.

Figure 8:
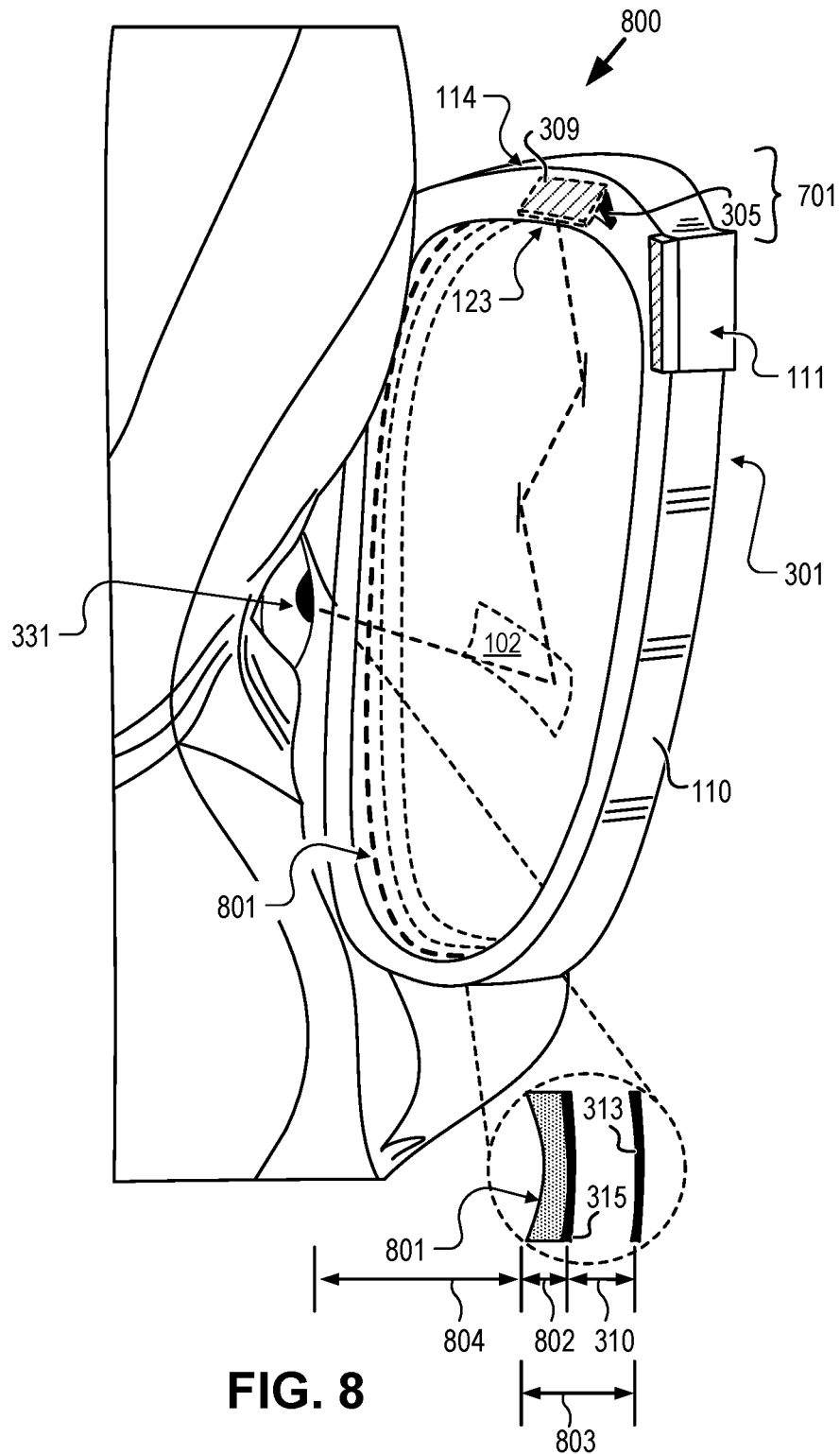

FIG. 8 illustrates a perspective view of an eyewear device 800 in accordance with some embodiments generally from the back and right sides where the device 800 is similar to the device 100 illustrated in other figures. The device 800 provides a prescriptive eye correction of approximately +2D with addition of a corrective lens 801 positioned interiorly in the frame 110. Only a right portion of the device 800 is illustrated to expose operation and a position of the device 800 relative to the user eye 331. Light from the display 105 is first directed toward the eye-side of the device 800 inside a top portion 701 of the frame 110 and is then directed into a top side of the lightguide 301 by reflection from the mirror 309. As shown in the inset, the lightguide 301, light is reflected between a first surface—the world-side surface 313—and a second surface—the eye-side surface 315. The display 105 and the mirror 309 are incorporated into the frame 110 between the top side 114 (surface) of the frame 110 and the top edge 123 of the lightguide 301. The frame 110 rests on the bridge of the nose 329 of the user 330. The mirror 309 directs the display light to the combiner 102. The combiner 102 reflects the display light into the pupil of the user eye 331. Certain parts of the device 800 fit within the top portion 701 of the frame 110 including the display 305 and the mirror 309. The top portion 701 of the device 800 is up to about 3.5 mm in size vertically for a 3:1 ratio display 305. For a +2D eye glass device 800, at least at or near an optical axis through the user eye 331, a total thickness 803 is approximately 7.79 mm and an eye relief distance 804 between the lightguide and a front (cornea) of the eye 331 is approximately 11.34 mm. For a 4 mm lightguide thickness 310, a corrective lens thickness 802 is approximately 3.79 mm.

Figure 9:
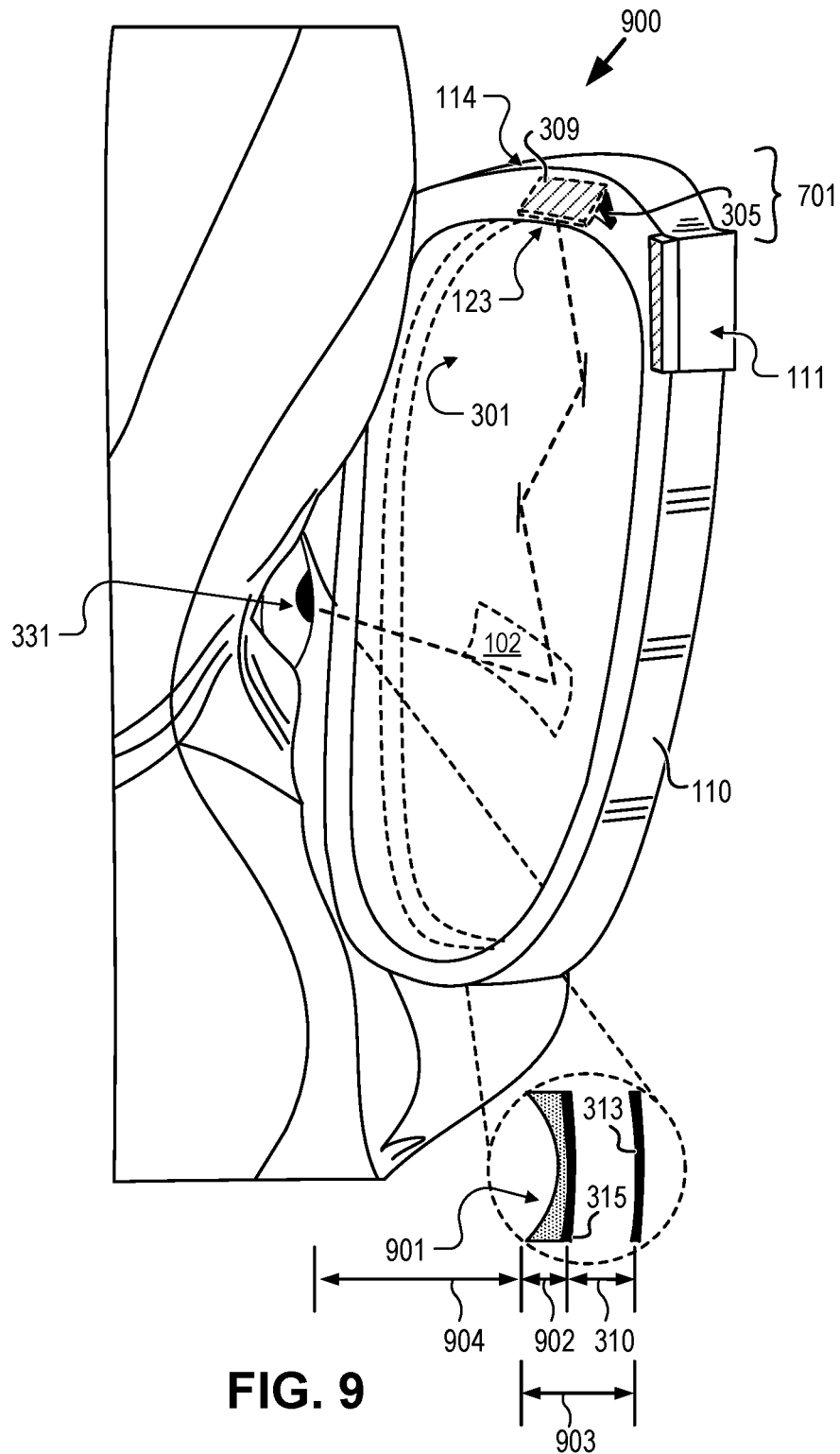

FIG. 9 illustrates a perspective view of an eyewear device 900 in accordance with some embodiments generally from the back and right sides where the device 900 is similar to the device 100 illustrated in other figures. The device 900 provides a prescriptive eye correction of approximately −4D with addition of a corrective lens 901 positioned interiorly in the frame 110. Only a right portion of the device 900 is illustrated to expose operation and a position of the device 900 relative to the user eye 331. Light from the display 105 is first directed toward the eye-side of the device 900 inside a top portion 701 of the frame 110 and is then directed into a top side of the lightguide 301 by reflection from the mirror 309. As shown in the inset, the lightguide 301, light is reflected between a first surface—the world-side surface 313—and a second surface—the eye-side surface 315. The display 105 and the mirror 309 are incorporated into the frame 110 between the top side 114 (surface) of the frame 110 and the top edge 123 of the lightguide 301. The frame 110 rests on the bridge of the nose 329 of the user 330. The mirror 309 directs the display light to the combiner 102. The combiner 102 reflects the display light into the pupil of the user eye 331. Certain parts of the device 900 fit within the top portion 701 of the frame 110 including the display 305 and the mirror 309. The top portion 701 of the device 900 is up to about 3.5 mm in size vertically for a 3:1 ratio display 305. For a −4D eye glass device 900, at least at or near an optical axis through the user eye 331, a total thickness 903 is approximately 5.56 mm and an eye relief distance 904 between the lightguide and a front (cornea) of the eye 331 is approximately 13.57 mm. The lens 901 is thicker at a top and bottom of the lens 901 to conform with a lens curvature to provide the −4D correction. While a vertical cross-section and a single thickness profile are shown for the corrective lenses 801, 901, the shape of these lenses is adjustable so as to provide correction for astigmatism for a user eye. For a 4 mm lightguide thickness 310, a corrective lens thickness 902 is approximately 1.56 mm at its thinnest.

Figure 10:
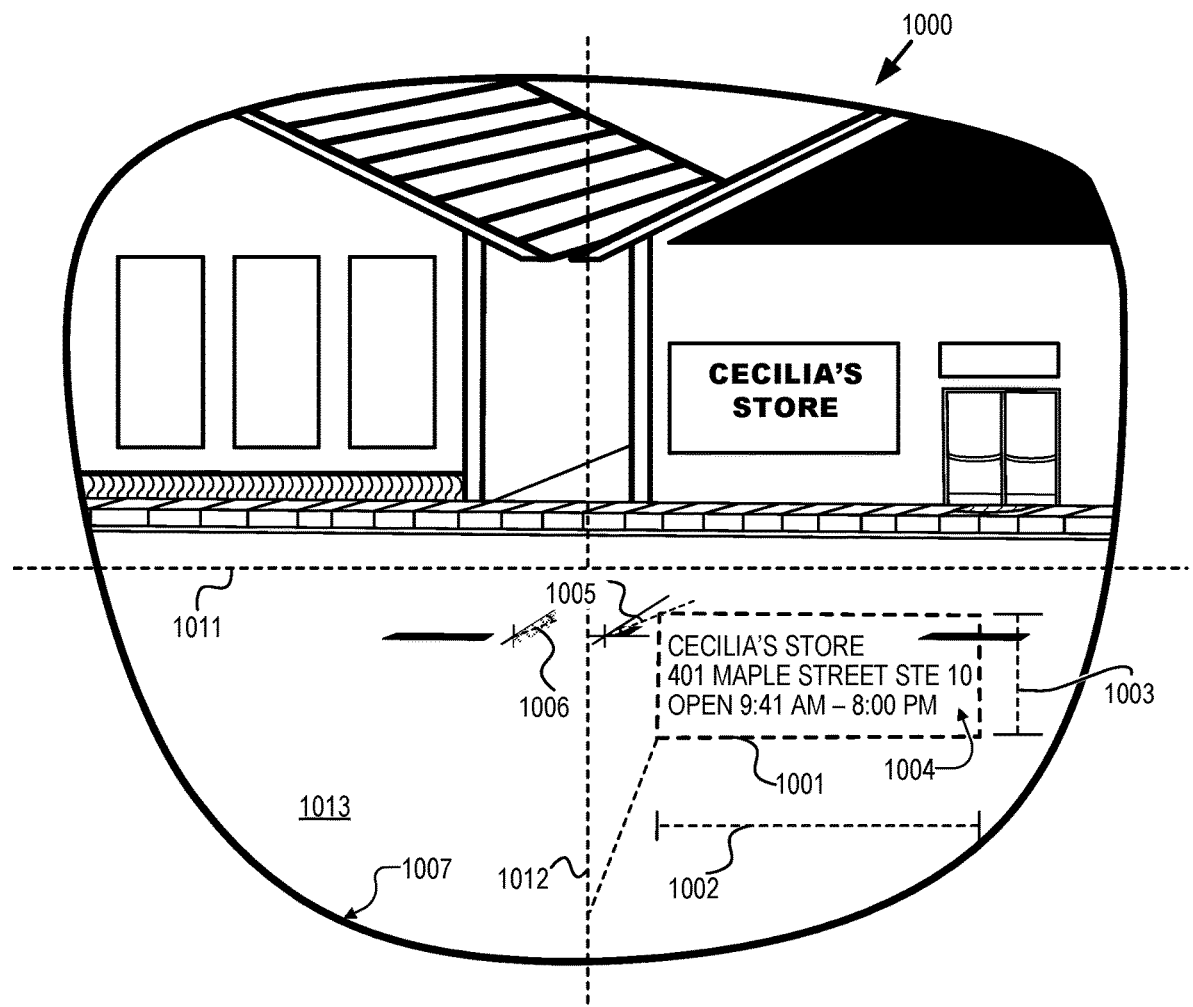
FIG. 10 illustrates a scene as viewed through one of the lenses of an eyewear device in accordance with some embodiments.

FIG. 10 illustrates a scene 1000 as viewed through one of the lenses of an eyewear device in accordance with some embodiments. For sake of illustration, the scene 1000 is visible inside of an edge 1007 of a frame and the scene 1000 is divided into quadrants by a horizontal bisecting line 1011 and a vertical bisecting line 1012. An augmented reality (AR) image 1001 is produced by a display of the eyewear device such as the device 100. The AR image 1001 is displayed according to a 3:1 aspect ratio 3:1 (width-to-height; horizontal-to-vertical) where the image 1001 and display generating the same are approximately 528 pixels by 132 pixels in size along a horizontal dimension 1002 and a vertical dimension 1003. The display would then have 132 pixel rows having a pixel row length of 528 pixel units.

The resolution of the AR image 1001 corresponds to a number of pixels per unit of measure and a size of each pixel of the display generating the AR image 1001. As observed by a user, the device 100 produces the AR image 1001 with 24-44 pixels per degree of visibility in the observed image. Such range of magnification of pixels provides adequate legibility and unobtrusive pixel visibility. Pixel size at the display is between 7 and 50 μm. In terms of color bit depth, at least 4 bits per color is used for the AR image 1001. The AR image 1001 is refreshed at a refresh rate between 1 and 30 Hz. In terms of a display interface, multiple types of display interfaces are usable. In some embodiments, a one-lane display serial interface (DSI) that complies with a specification of the Mobile Industry Processor Interface (MIPI) and that is operated in a command mode is used to drive the display to generate the AR image 1001 according to an image data source. In terms of power consumption, the AR image 1001 is generated by a power source having at least 50 mWh of battery capacity when battery driven.

In terms of size, a FOV of the image 1001 is approximately 15 degrees horizontal and 5 degrees vertical and is located in a bottom right quadrant of the scene 1000 according to some embodiments. This location is based on user feedback across a number of trials. For an eyewear device 100, the AR image 1001 is positioned in any one of the quadrants of the scene 1000 and, depending on its location, would exhibit a change in size based on the geometries of the components of the device 100. In terms of location within the scene 1000, the AR image 1001 is positioned at approximately 10 degrees to the right from a vertical plane as indicated by a first angle 1005 and at approximately 12 degrees downward from a horizontal plane through an optical axis as indicated by a second angle 1006.

For an AR image having an 8:1 aspect ratio, the FOV is approximately 20 degrees horizontal by 2.5 degrees vertical and the generating display would be of a correspondingly different number of pixels in relation to the display generating the 3:1 aspect ratio AR image 1001. In terms of hardware, as measured at the display, each of the pixels are of a particular size between 7 microns to 50 microns depending on the type of display used in the eyewear device (e.g., an OLED display, an LCD display). The image 1001 exhibits less than a 3% distortion and at least a 15% polychromatic modulation transfer function (MTF) at a pixel near a center of the image 1001. When mounted in the frame, the display is less than 90% vignetted in a first (horizontal) direction and in a second (vertical) direction such that a mask does not obscure many of the pixels of display when generating the AR image 1001.

In some embodiments, the AR image 1001 is provided with three lines of text 1004 over some or all of the entire image. These lines of text 1004 provide AR information to the viewer. In this instance, as illustrated, the AR information confirms a business name at a location in the scene 1000, street address, and hours of operation as the user stands across a street outside of the business and gazes in a direction toward the business. Beyond text, other types of information are deliverable in the AR image 1001 including video, icons, and images and this information is updated over time. For example, while driving, the AR image 1001 provides text and driving symbols to a user depending on a location of the user wearing the eyewear device 100.

Figure 11:
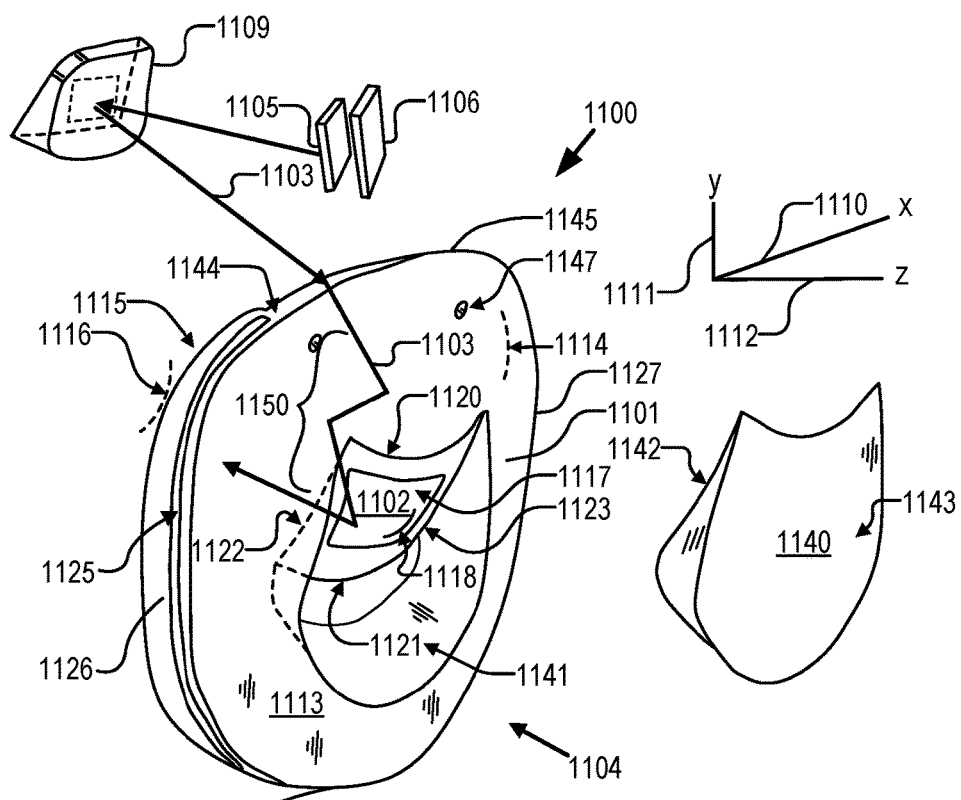
FIG. 11 illustrates an exploded perspective view of a lightguide first illustrated in FIG. 1.

FIG. 11 illustrates an exploded perspective view of a lightguide such as the lightguide 101 first illustrated in FIG. 1. A set of components 1100 of an eyewear device 100 include the lightguide 1101 and a matching filler piece 1140. The filler piece 1140 is optional and together with the lightguide 1101 are one embodiment of a lens for an optics device described herein. The matching filler piece 1140 is included with the lightguide 1101 so as to create the eyewear device 100 with an appearance of ordinary eyewear and having the functionalities as described herein. Surfaces of the filler piece 1140 are shaped to match surfaces of the lightguide 1101 including surfaces of a recess 1141 in the lightguide 1101. For example, on an eye-side of the filler piece 1140, a first matching surface 1142 of the filler piece 1140 is shaped to match a combiner curvature 1118 of a combiner surface 1117 of a combiner aperture 1102 of the lightguide 1101. To the extent that the filler piece 1140 extends to an eye-side of the lightguide 1101, another surface of the filler piece 1140 is shaped to match an eye-side curvature 1116 of an eye-side surface 1115 of the lightguide 1101. The combiner aperture 1102 is found within boundaries of the combiner surface 1117. The combiner surface 1117 is defined by a top interface line 1120, a bottom interface line 1121, an outer interface line 1122, and an inner interface line 1123. Each of the lines 1120-323 are found at the intersection of respective surfaces of the lightguide 1101. On a world-side of the filler piece 1140, a second matching surface 1143 is shaped to match a world-side curvature 1114 of a world-side surface 1113 of the lightguide 1101.

Display light 1103 from a display 1105 and ambient light 1104 from the world-side of the lightguide 1101 are combined in the combiner aperture 1102. The display 1105 includes light emitting elements (e.g., passive- or active-matrix organic light-emitting or organic electroluminescent diode (OLED)) and is supported electronically and mechanically by a set of components grouped together in a package 1106 as known to those in the art. Display light 1103 emitted from the display 1105 travels to a reflector 1109 as shown by a light path 1150 and is reflected into the lightguide 1101. An area on a back surface of the reflector 1109 shows where light 1103 is reflected. The combiner aperture 1102 is a portion of the combiner surface 1117 that ultimately reflects the display light 1103 toward the eye-side of the lightguide

1101. Display light 1103 generated by the display 1105 is directed by a surface of the reflector 1109 into a top surface 1144 of the lightguide 1101 and travels therein by total internal reflection (TIR). In some embodiments, the top surface 1144 is part of a prism or field lens that is then sealed inside a frame (not illustrated) relative to and with other components of the lightguide 1101.

Once directed inside the lightguide 1101, the display light 1103 reflects inside the lightguide 1101 at least one time from each of the world-side surface 1113 and the eye-side surface 1115. Preferably, the display light 1103 reflects one time from each of the surfaces 1113, 1115 before exiting on the eye-side of the lightguide 1101. The shapes of the surfaces of each component of the set of components 1100, including the surfaces of the lightguide 1101 and the filler piece 1140, include a dimensional component along one or more of a first (x) axis 1110, a second (y) axis 1111, and a third (z) axis 1112. For example, the combiner surface 1117 is curved from a perspective relative to the first axis 1110 and curved from a perspective relative to the second axis 1111 as further shown in other figures and further described herein.

The lightguide 1101 includes an outer groove 1125 in an outer edge 1126 and an inner edge 1127. The outer groove 1125 extends from a top side 1145 to a bottom side 1146. The outer groove 1125 is also formed in the top side 1145 and the bottom side 1146 of the lightguide 1101. The outer groove 1125 along the edges 1126, 1127 and sides 1145, 1146 mate to a ridge of a frame (not illustrated) so as to hold the lightguide 1101 fixed in the frame as shown in the frame 110 of FIG. 1. In FIG. 11, the lightguide 1101 also includes one or more features such as one or more passages 1147 into or through the lightguide 101 for receiving fasteners (not illustrated) to hold a display housing (not illustrated) and the display 105 at a fixed position and orientation at the top side 1145.

Figure 12:
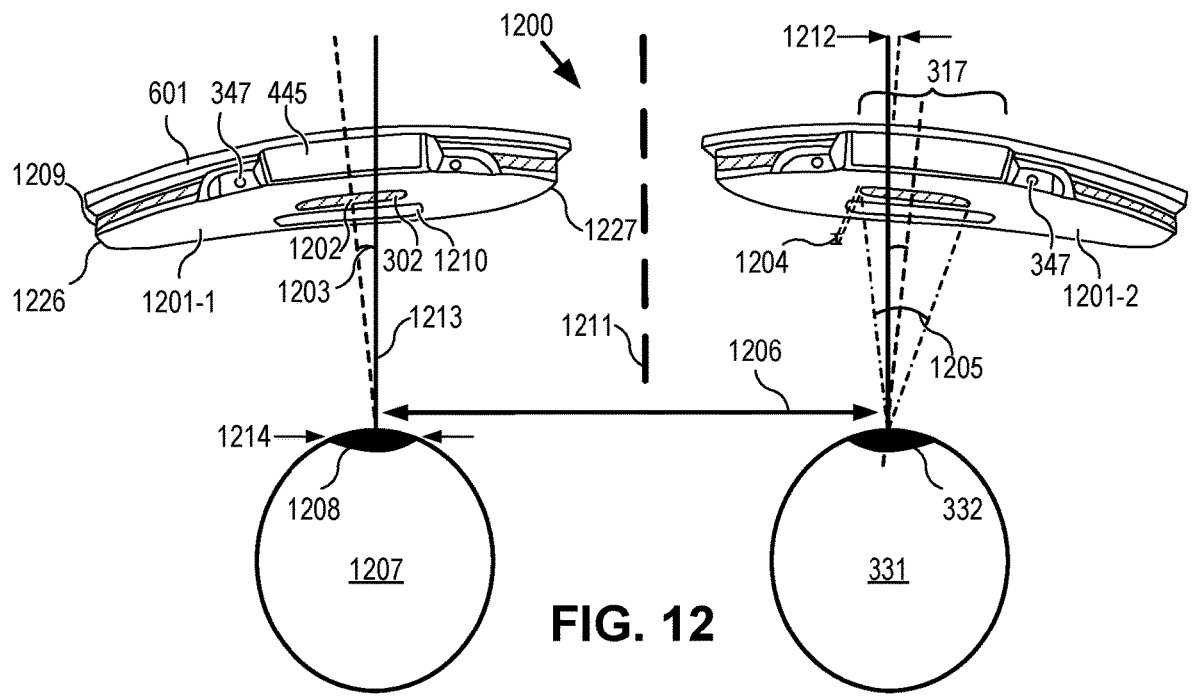
FIG. 12 illustrates an overhead view of lightguides as positioned in a frame as shown in a frame in accordance with some embodiments.

FIG. 12 illustrates an overhead view 1200 of two lightguides 1201-1, 1201-2 as positioned in the frame 110 as shown in FIGS. 1 and 2 in accordance with some embodiments. The lightguides 1201-1, 1201-2 are arranged in a binocular arrangement, one for each eye, which facilitates a proper view of 3D and AR content. The first (right) lightguide 1201-1 is positioned in front of a first (right) eye 331 and a first (right) pupil 332. A second (left) lightguide 1201-2 is positioned in front of a second (left) eye 1207 and a second (left) pupil 1208. Each of the lightguides 1201-1, 1201-2 includes one or more grooves 1209 in one or more edges thereof for interfacing with the frame 110 (not illustrated for clarity). For example, a groove 1209 is found in the outer edge 1226 and the inner edge 1227 of each of the lightguides 1201-1, 1201-2. Visible in an eye-side surface of each lightguide 1201-1, 1201-2 is an opening 1210 corresponding to a back side of recess between parts of the lightguide 301 as in other figures including FIGS. 3 and 4. In some embodiments, a transparent shell 601 is positioned on a world-side of each lightguide 1201-1, 1201-2. One or more passages are formed in each of the lightguides 1201-1, 1201-2 to facilitate affixing certain elements thereto. A top surface 445 for receiving display light from a display (not illustrated) is located in a central position at a top edge of each lightguide 1201-1, 1201-2.

The lightguides 1201-1, 1201-2 are positioned an equal distance from a central axis 1211 as evidenced by a respective visual axis 1213 for each of the eyes 331, 1207. A center 1202 of a combiner aperture 302 in each lightguide 1201-1, 1201-2 is positioned a first wrap angle 1203 with respect to the respective eye 331, 1207. The first wrap angle 1203 is greater than a second wrap angle 1212 of each of the lightguides 1201-1, 1201-2 where the second wrap angle 1212 is relative to a normal taken from a front surface of the respective lightguides 1201-1, 1201-2. For example, the first wrap angle 1203 is approximately seven degrees while the second wrap angle 1212 is approximately 0.9 degrees. The IPD 1206 is approximately 63 mm between the visual axis of each eye 331, 1207. Each of the combiner apertures 302 includes a vertical field size 1204 of approximately 5 degrees and a total horizontal field size 1205 of approximately 34 degrees relative to and for each of the pupils 332, 1208 of the first and second eyes 331, 1207 based on a pupil size 1214 of approximately four mm. Because of an image offset and geometries of the various components, the FOV of the resultant AR image 1001 at the combiner surface 317 is approximately 15 degrees by 5 degrees for a 3:1 aspect ratio display 305 and approximately 20 degrees by 2.5 degrees for an 8:1 aspect ratio display 305. Overall, a total horizontal FOV (HFOV) 1205 across each of the combiner surfaces 317 is approximately 34 degrees with a nasal side width of approximately 17 degrees and a temporal side width of another approximately 17 degrees. A binocular overlap is approximately 34 degrees.

Figure 13:
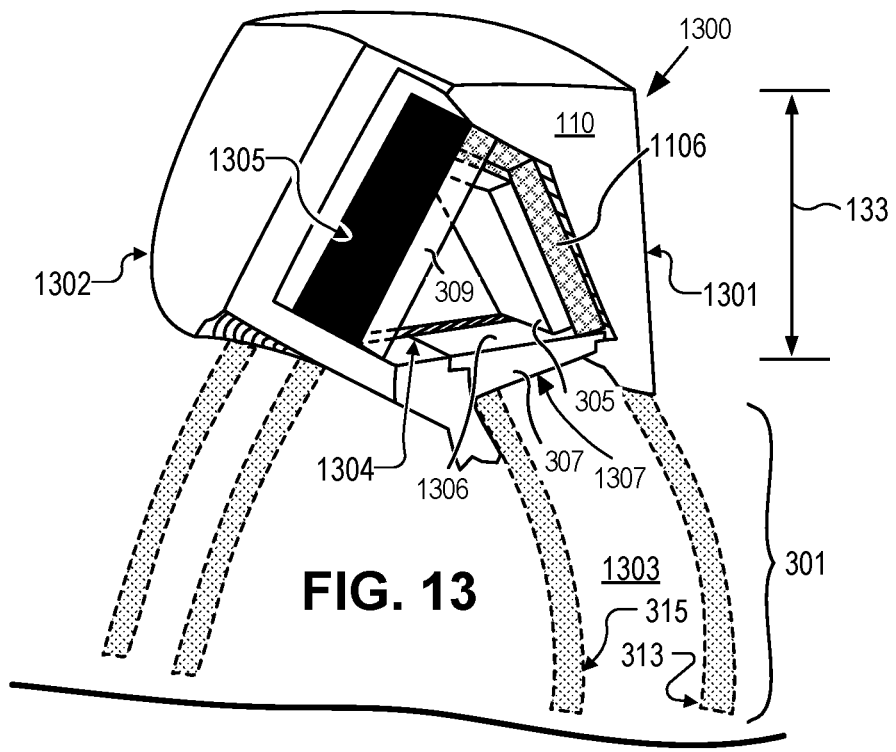
FIGS. 13 and 14 illustrate a perspective cut-away view of an eyewear device in accordance with some embodiments.

FIG. 13 illustrates a perspective cut-away view of an assembled eyewear device 1300 in accordance with some embodiments. The device 1300 illustrates a world-side portion 1301 and an eye-side portion 1302 of the frame 110. One or more components of the device 1300 are mounted inside of a generally pentahedral-shaped compartment 1304 of a top portion of the frame 110. The hollow compartment 1304 is alternatively described as a cavity having a vaulted interior where the sides or surfaces are shaped to facilitate mounting of the various components therein. In some embodiments, the components in the compartment 1304 include one or more of the display 305, the package 1106, the field lens 307, and the mirror 309. The compartment 1304 is above an optical axis of the apparatus when worn by a user.

Two or more of these and other components are assembled as a unit and the unit is then mounted inside of the frame 110 during assembly to create a finished eyewear device 1300. Various combinations of the contents of these assembly units are possible for convenience during assembly. As one example, the field lens 307 is assembled and sealed with the lightguide 301. In another example, the field lens 307, the display 305, the package 1106, and the mirror 309 are assembled together as a unit and are then placed or formed inside of the compartment 1304. The compartment 1304 and frame 110 shaped with one or more ridges or contours so as to receive and hold securely in place an assembled unit. In terms of arrangement of components, as illustrated, the display 305 and the package 1106 are mounted against the world-side portion 1301 of the frame 110 and the compartment 1304. The package 1106 includes various electronic components that power and activate light emitting elements (not illustrated) of the display 305.

The mirror 309 is mounted on the eye-side portion 1302 of the compartment 1304. The mirror 309 includes a reflective surface 1305. The display 305 is oriented to direct light emitted from the display 305 toward the eye-side of the device 1300 and toward the mirror 309. In this orientation, with the substantially enclosed compartment 1304, the device 1300 avoids leaking light outside of the frame 110 except through the interior 1303 of the lightguide 301. The device 1300 thereby maintains an appearance of ordinary eyewear. At least the reflective surface 1305 of the mirror 309 is oriented with respect to the display 305 and the field lens 307 so as to reflect light into a first surface 1306 of the field lens 307, out of a second surface 1307, and into an interior 1303 of the lightguide 301. In some embodiments of the device 1300, no field lens 307 is used. In other embodiments, the field lens 307 is combined with or coupled to the mirror 309 such that a single reflector component takes the place of the mirror 309 as illustrated without losing any of the functionality of the device 1300. In this way, the field lens 307 would not appear as its own separate component and would thereby be an optional component when considering a number of components to assemble the device 1300.

The interior 1303 of the lightguide 301 is between the world-side surface 313 and the eye-side surface 315. A top portion of the frame 110 that houses the various components has a thickness 133 of up to 4 mm with some embodiments having a thickness 133 of 3.5 mm or less depending on one or more factors such as a size of the pixels of the display 305, a number of pixels in the display 305, and a dimensional size of one or more of the display 305, the package 1106, the field lens 307, and the mirror 309.

To achieve a desired and minimized vertical thickness 133, a plurality of factors is considered. For example, and in no particular order, a first angle of orientation between the display 305 and the mirror 309 is selected. This first angle is coordinated with a second angle of orientation between the mirror 309 and the field lens 307. The first and second angles of orientation and the physical arrangement of the components 305, 307, 309 are coordinated with the orientation of one or both surfaces 1306, 1307 of the field lens 307 so as to direct the display light into the lightguide 301 at a desired orientation and a desired magnification at a top edge of the lightguide 301. Further, the orientations and curvatures of the world-side surface 313 and the eye-side surface 315 are also considered in order to deliver a desired AR image as illustrated in other figures in relation to the combiner 102 and the position of the combiner 102 relative to the user eye.

In some embodiments, one or more surfaces of a component inside of the compartment 1304 are mounted directly against an interior surface of the compartment 1304 with a fastener or an adhesive. When secured in this manner, the component maintains its position with respect to the others in the device 1300 and with respect to the lightguide 301. In some embodiments, a plurality of the components 305, 307, 309, 1106 are assembled together before being assembled as a unit into the compartment 1304 of the frame 110 thereby providing a more consistent orientation with respect to each other during manufacture of many copies of the device 1300.

Figure 14:
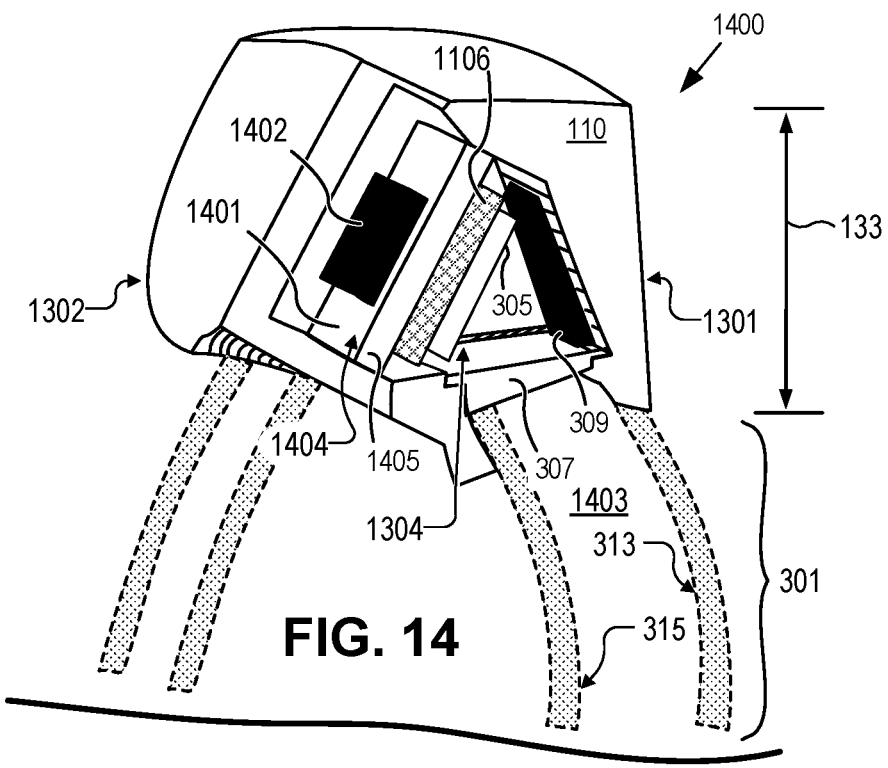

FIG. 14 illustrates a perspective cut-away view of an eyewear device 1400 in accordance with some embodiments. The device 1400 includes an alternative arrangement of the components of the device 1300 of FIG. 13. The device 1400 illustrates the world-side portion 1301 and the eye-side portion 1302 of the frame 110. Components of the device 1400 are mounted inside of the generally pentahedral-shaped compartment 1304 of a top portion of the frame 110. The compartment 1304 is a first compartment in the frame 110. The components of the device 1400 include the display 305, the package 1106, the field lens 307, and the mirror 309. The display 305 and the package 1106 are mounted against a support structure 1401 along the eye-side portion 1302 of the frame 110 and the compartment 1304. Between the support structure 1405 and an exterior of the frame 110 is formed a second compartment 1401 in which is positioned an assembly structure 1402. The assembly structure 1402 is mounted to the package 1106 and the display 305 such as through the use of one or more fasteners through the support structure 1405 or is otherwise interlocked by a dovetail or other mechanical feature of the package 1106 with a mechanical feature of the support structure as used by those in the art. The support structure 1405, in some embodiments, is formed in and with a same material as the frame 110. Other shapes and sizes of the support structure 1405 are possible depending on a final shape of the components to be incorporated into the eyewear device 1400. In some embodiments, two or more of the package 1106, the display 305, the field lens 307, and the mirror 309 are formed into an assembly unit for placing into the compartment 1304 and securing the unit such as by way of the assembly structure 1402. When one or more of the compartments 1304, 1401 are sealed, sensitive electronics can be placed therein and are protected against dust and contact such as during assembly, handling, and operation by an end user.

In terms of orientation of the components, the mirror 309 is mounted on the world-side portion 1301 of the frame 110 relative to the compartment 1304. The mirror 309 includes a reflective surface. The display 305 is oriented to direct light emitted from the display 305 toward the world-side 1301 of the device 1400 and toward the mirror 309. In this orientation, with the substantially enclosed compartment 1304, the device 1400 avoids leaking light outside of the device 1400 except through the interior 1403 of the lightguide 301. The device 1400 thereby maintains an appearance of ordinary eyewear. Further, the thickness 133 of the frame 110 above the lightguide 301 is held to a minimum or at least to a similar size as an ordinary eyewear. At least the reflective surface of the mirror 309 is oriented with respect to the display 305 and the field lens 307 so as to reflect light into a first surface of the field lens 307, out of a lower, second surface of the field lens 307, and into an interior 1403 of the lightguide 301. In some embodiments of the device 1400, no field lens 307 is used. In other embodiments, the field lens 307 is combined with or coupled to the mirror 309 such that a single reflector component takes the place of the mirror 309 as illustrated without losing any of the functionality of the device 1400. In this way, the field lens 307 would not appear as its own separate component and would thereby be an optional component when considering a number of components to assemble the device 1400.

The interior 1403 of the lightguide 301 is between the world-side surface 313 and the eye-side surface 315. A top portion of the frame 110 that houses the various components has a thickness 133 of up to 4 mm with some embodiments having a thickness 133 of 3.5 mm or less depending on one or more factors such as a size of the pixels of the display 305, a number of pixels in the display 305, and a dimensional size of one or more of the display 305, the package 1106, the field lens 307, and the mirror 309.

To achieve a desired and minimized vertical thickness 133, a plurality of factors is considered. For example, and in no particular order, a first angle of orientation between the display 305 and the mirror 309 is selected. This first angle is coordinated with a second angle of orientation between the mirror 309 and the field lens 307. The first and second angles of orientation and the physical arrangement of the components 305, 307, 309 are coordinated with the orientation of one or both surfaces 1306, 1307 of the field lens 307 so as to direct the display light into the interior 1403 of the lightguide 301 at a desired orientation and a desired magnification at a top edge of the lightguide 301. Further, the orientations and curvatures of the world-side surface 313 and the eye-side surface 315 are also considered in order to deliver a desired AR image as illustrated in other figures in relation to the combiner 102 and the position of the combiner 102 relative to the user eye.

In some embodiments, certain aspects of the techniques described above may implemented by one or more processors of a processing system executing software such as to generate a signal for the display in the eyewear whereby the signal causes the display to provide light that ultimately is the AR-based image that is viewable by the user eye. The signal may be generated by a software that includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above including operating of the display inside of the eyewear device. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. The benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed to subject matter. Accordingly, the protection sought herein is as set forth in the claims below.

What is claimed is:

1. An optical device comprising:
a display oriented toward an eye-side of the optical device and configured to emit light toward the eye-side of the optical device based on an input signal;
a lightguide having:
a curved first surface at the eye-side of the optical device; and
a curved second surface for reflecting the light through the curved first surface to a user eye;
a reflector having a reflective surface positioned at the eye-side relative to the display above at least one of the curved first surface and the curved second surface of the lightguide, wherein the reflector is positioned to reflect light from the display into the lightguide; and
a head mountable frame supporting the display, the reflective surface, and the lightguide, wherein the display is positioned at a top of the head mountable frame.

2. The optical device of claim 1, further comprising:
a field lens having a first surface to receive light from the reflector and a second surface oriented toward an interior of the lightguide, wherein the field lens is positioned at a top side of the lightguide.

3. The optical device of claim 2, wherein a second surface of the field lens, oriented toward the lightguide, is spherical in shape.

4. The optical device of claim 2, wherein a surface of the field lens, the lightguide, or both the field lens and the lightguide is shaped to correct an astigmatism of a computer-generated image of the light from the display in at least one of a first dimension and a second dimension as the light progresses from the display toward the user eye.

5. The optical device of claim 1, wherein the display, the lightguide, and the reflector are positioned so as to reflect light at least two times from at least one of the curved first surface and the curved second surface of the lightguide before the light from the display reaches the user eye.

6. The optical device of claim 1, wherein the lightguide includes a third surface at a top of the lightguide for receiving light from the reflector.

7. The optical device of claim 1, wherein the display, the reflector, and the lightguide are arranged in the optical device to provide at least a 10 degree diagonal field of view with respect to a resulting image from the display.

8. The optical device of claim 1, wherein the display, the reflector, and the lightguide are arranged in the optical device to provide at least a 3:1 horizontal-to-vertical aspect ratio with respect to a resulting image from the display.

9. The optical device of claim 1, wherein an eye relief distance from the curved first surface of the lightguide to the user eye is 26 millimeters or less.

10. The optical device of claim 1, wherein a top edge of a resulting image is located at least 2 degrees below a center axis of a pupil of the user eye.

11. The optical device of claim 1, wherein a resulting image from the display is oriented with at least 2 degrees of pantoscopic tilt relative to the user eye.

12. The optical device of claim 1, wherein a fourth surface of the lightguide is spherical having a spherical dimension between 80 mm and 100 mm of curvature.

13. The optical device of claim 1, wherein the curved second surface of the lightguide includes a combiner for a resulting image from the display, and wherein a resulting image from the display and a world view form a combined view to the user eye.

14. The optical device of claim 1, further comprising:
a filler piece having a first surface shaped to conform to a world-side fourth surface of the lightguide and shaped to fit into a recess in the lightguide, wherein the filler piece has a second surface shaped to conform to the curved second surface of the lightguide.

15. The optical device of claim 1, wherein the first and second curved surfaces are transparent and the lightguide further includes:

a transparent third surface oriented toward the top of the head mountable frame for receiving display light, the display light reflecting inside the lightguide via total internal reflection; and a transparent curved fourth surface shaped to reflect light from the display through the transparent curved first surface to a user eye and to combine the display light with ambient light entering from a world-side through the transparent curved second surface of the lightguide, wherein the reflector is positioned on the eye-side of the optical device and oriented to direct light from the display into the lightguide through the transparent third surface.

16. The optical device of claim 15, further comprising a display lens positioned at the top of the lightguide, wherein a first surface of the display lens is oriented toward the third surface of the lightguide, and wherein the first surface of the display lens is curved in a freeform manner along a first axis and the first surface of the display lens is curved along a second axis perpendicular to the first axis thereby augmenting a resultant image area in at least one dimension at the transparent curved fourth surface of the lightguide.

17. The optical device of claim 16, wherein a curvature of the transparent curved fourth surface of the lightguide is freeform along at least one axis, and wherein light from the display is reflected at least two times by internal reflection from each of the curved first and second surfaces of the lightguide before reflecting from the transparent curved fourth surface and being transmitted through the transparent curved first surface on the eye-side of the lightguide toward a user eye.

18. The optical device of claim 16, wherein a curvature of the transparent curved third surface of the lightguide is freeform along at least one axis thereby augmenting a resultant image area in at least one dimension at the transparent curved fourth surface of the lightguide.

19. An apparatus comprising:
a display positioned at a top of a head wearable frame and oriented toward an eye-side of the apparatus;
a lightguide to direct light from the display toward an eye-direction, the lightguide including:
 a transparent curved first surface on the eye-side of the lightguide;
 a transparent curved second surface on a world-side of the lightguide;
 a transparent third surface oriented toward the top of the head wearable frame for receiving display light, the display light reflecting inside the lightguide via total internal reflection; and
 a transparent curved fourth surface shaped to reflect light from the display through the transparent curved first surface to a user eye and to combine the display light with ambient light entering from the world-side through the transparent curved second surface of the lightguide; and
a reflector positioned on the eye-side of the apparatus and oriented to direct light from the display into the lightguide through the transparent third surface.

20. The apparatus of claim 19, further comprising a display lens positioned at the top of the lightguide, wherein a first surface of the display lens is oriented toward the third surface of the lightguide, and wherein the first surface of the display lens is curved in a freeform manner along a first axis and the first surface of the display lens is curved along a second axis perpendicular to the first axis thereby augmenting a resultant image area in at least one dimension at the transparent curved fourth surface of the lightguide.

21. The apparatus of claim 20, wherein a curvature of the transparent curved fourth surface of the lightguide is freeform along at least one axis, and wherein light from the display is reflected at least two times by internal reflection from each of the curved first and second surfaces of the lightguide before reflecting from the transparent curved fourth surface and being transmitted through the transparent curved first surface on the eye-side of the lightguide toward a user eye.

22. The apparatus of claim 20, wherein a curvature of the transparent curved third surface of the lightguide is freeform along at least one axis thereby augmenting a resultant image area in at least one dimension at the transparent curved fourth surface of the lightguide.

23. The apparatus of claim 19, wherein the display and the reflector are mounted inside of a generally pentahedral-shaped compartment of a top portion of the head wearable frame above an optical axis of the apparatus.

* * * * *